July 23, 1957   A. J. DOYLE ET AL   2,800,245
SAFETY CAP FOR AUTOMOTIVE LIQUID FUEL TANKS
Filed May 2, 1955
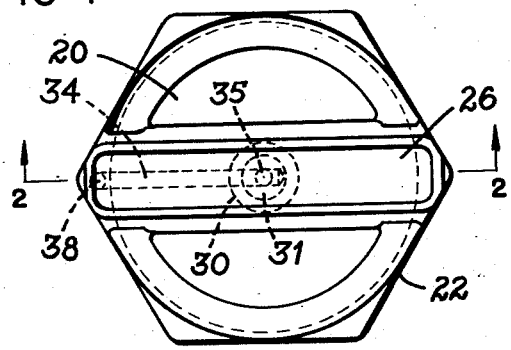
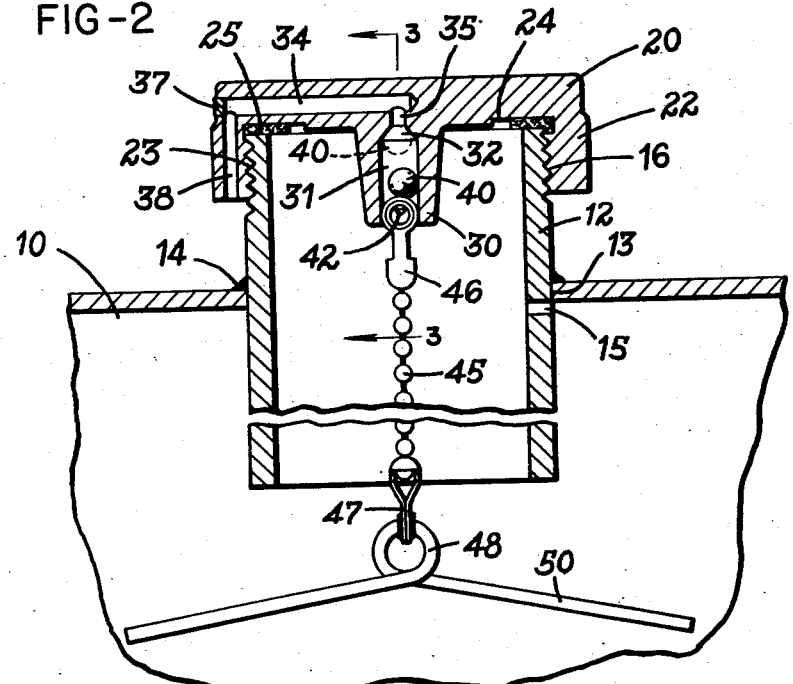
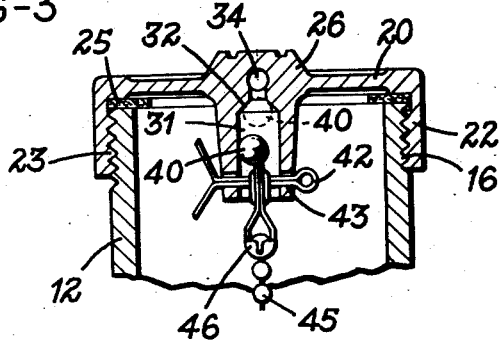
INVENTORS
ARTHUR J. DOYLE &
BY WILLIAM M. WADSWORTH
*Marshal, Biebel, French & Bugg*
ATTORNEYS

United States Patent Office 2,800,245
Patented July 23, 1957

2,800,245

SAFETY CAP FOR AUTOMOTIVE LIQUID FUEL TANKS

Arthur J. Doyle and William M. Wadsworth, Middletown, Ohio, assignors to Prior Products, Inc., Dallas, Tex., a corporation of Texas Application May 2, 1955, Serial No. 505,154

1 Claim. (Cl. 220—44)

This invention relates to safety caps adapted particularly for use on automotive liquid fuel tanks.

In the construction of automotive fuel tanks for holding liquid fuel, it is necessary to provide some type of venting system which will maintain the interior of the tank at ambient pressure. If this is not done, and the tank is made substantially airtight, the depletion of the fuel within the tank as it is supplied to the engine will eventually result in a vacuum condition in the air space above the fuel, with resulting stoppage of the flow of fuel to the engine. The simplest way to provide for such venting is to incorporate some sort of venting system in the cap for the filling neck of the tank. The filling neck usually opens adjacent the top of the tank and thus is capable of being connected with the uppermost part of the air space within the tank. Furthermore, it is much easier to clean the venting system from time to time, for instance by blowing it out with compressed air, if the major parts of the venting system may be removed from the tank, as is the case when the system is incorporated in the gas cap.

Unfortunately, the incorporation of the venting system in the cap leads to certain difficulties, and it is to the overcoming of these difficulties that the present invention is directed. First, placing the vent in the cap minimizes the principal object of the cap itself, since a small opening is left at the outer end of the filling neck rather than closing and sealing this outer end completely. This is not important under ordinary conditions, but should the vehicle be overturned in an accident the fuel could flow through the vent opening and present a very serious fire hazard. Secondly, the cap is often exposed to the elements and if the vent should become clogged with snow, ice, mud or the like and thereby rendered inoperative, the result, as pointed out above, would be that fuel flow to the engine may be stopped.

Accordingly, it is a primary object of the present invent to provide a safety cap for automotive liquid fuel tanks having a vent passageway in the cap which opens beneath the outer edge of the cap so that the vent opening is shielded from the elements and less likely to become clogged.

Another object of this invention is to provide such a safety cap wherein a valve member is carried within the vent passageway so as to be unseated by the force of gravity under normal conditions and so arranged as to block the vent passageway when the fuel tank is abnormally tilted and thereby to prevent passage of fuel outwardly through the vent passageway.

Other objects and advantages of the invention will be apparent from the following description, the accompanying drawing and the appended claim.

In the drawing:

Fig. 1 is a top view of a safety cap provided by this invention;

Fig. 2 is a vertical section along line 2—2 of Fig. 1, and including a portion of the liquid fuel tank; and Fig. 3 is a partial vertical section on a reduced scale along line 3—3 of Fig. 2.

Referring to the drawing, which illustrates a preferred embodiment of the present invention, and particularly to Fig. 2, there is seen a section of the upper wall of an automotive liquid fuel tank 10 having a cylindrical filling neck 12 secured within an opening 13 in the tank by a weld 14 or by other suitable means. Immediately adjacent the wall of the tank, the neck 12 is provided with a vent hole 15 to provide for access of air at the top of the tank to the interior of the neck 12 when the liquid fuel level in the tank rises above the lower end of the neck. The upper end of the neck 12 is provided with some means for receiving a cap and for locking the cap thereon. This means may be provided by any well known releasable catch used for this purpose, but is shown as including external threads 16 on the upper end of neck 12.

The safety cap provided by the invention includes a body 20 having a depending cylindrical flange 22 which is internally threaded at 23 to be received upon the threaded portion 16 of the filling neck. An annular groove or slot 24 is provided in the under surface of body 20 to receive an annular compressible gasket 25 which is pressed between the upper end of neck 12 and cap body 20, as seen in Figs. 2 and 3, to seal the cap to the filling neck. The outer surface of flange 22 may take any conventional shape, and for example, is shown as hexagonal to facilitate gripping the cap for twisting it on and off of the filling neck.

Extending transversely of the top surface of body 20 is a ridge 26, and depending from the center of body 20, and below the center of ridge 26, is a boss 30 having a central passageway 31 therein leading to a tapered seat portion 32. A vent passageway, for venting the interior of tank 10 via filling neck 12 and central passageway 31, is provided by a transverse bore 34 in ridge 26 which connects at its inner end with a small vertical opening 35, which in turn opens into the smaller end of the tapered seat 32. The outer end of bore 34 is sealed with a small plug 37, and a vertical bore 38 is provided through flange 22, opening at the lower end thereof and connecting at its upper end to the bore 34. Thus, air may pass into or out of tank 10 through passageway 31, seat 32, and the bores 34, 35 and 38 respectively.

To prevent flow of liquid fuel through this venting system when the tank 10 is overturned, a ball valve 40 having a diameter substantially less than passageway 31, but being large enough to seat upon the tapered seat 32, is retained within passageway 31 by a pin 42 (Fig. 3) passing through suitable holes 43 in the sides of boss 30 and across the enlarged passageway 31. Whenever the fuel tank is overturned, the ball valve 40 moves either close to or into engagement with seat 32, and the pressure of fuel flowing into passageway 31 is sufficient to seat the ball valve 40 firmly upon seat 32 and thereby to shut off the venting system. Under normal conditions the force of gravity upon ball valve 40 causes it to rest upon the pin 42, as seen in Figs. 2 and 3.

In order to retain the gas cap on tank 10 and still provide for its complete removal from and movement away from filling neck 12 during filling of the tank, a chain 45 is suitably secured by a clip 46 to the pin 42, and at its lower end is secured by a clip 47 to the central loop 48 of a spring member 50. This spring member is of a length substantially greater than the diameter of filling neck 12, and thus when the cap is removed and chain 45 is pulled upwardly through the filling neck, spring member 50 engages the bottom of the filling neck and exerts sufficient force through the chain to prevent the cap from being unintentionally completely detached from the tank. For purposes of repair of replacement, the spring member 50 may be removed by exerting sufficient force through chain 50 to draw the arms of the spring member together sufficiently to allow it to pass upwardly through the filling neck.

It will thus be seen that the present invention provides a safety cap of simple construction for fuel tanks which properly vents the tank under normal conditions, and which provides for closing of the vent passageway when the fuel tank is overturned, thereby avoiding leakage of the fuel through the vent passageway under abnormal conditions. In addition, the outlet of the vent passageway is located beneath the flange of the cap in such a position that it is substantially shielded from the elements and is less apt to be clogged or fouled.

While the form of apparatus described herein constitutes a preferred embodiment of the invention, it is to be understood that the invention is not limited to this precise form of apparatus, and that changes may be made therein without departing from the scope of the invention which is defined in the appended claim.

What is claimed is:

A cap adapted particularly for use on automotive liquid fuel tanks having a normally upwardly extending filling neck, comprising a unitary substantially flat body dimensioned to extend across in completely covering relation with the filling neck, an annular flange depending from said body to embrace the end of the filling neck and including means for positively engaging the neck to hold the cap in covering relation thereon, a boss depending from said body within said flange and arranged to extend partially into the filling neck, means defining a passageway extending through said cap for venting the interior of the tank to ambient pressure, said passage consisting of inner and outer portions and an intermediate portion, said inner portion including an enlarged lower section extending within said boss and connected with the upper section thereof by a valve seat, a valve having a diameter less than said enlarged section and greater than said seat receivable within said enlarged section in normally downwardly spaced relation with said seat for movement into sealing engagement with said seat in response to tilting of the tank causing movement of the filling neck to a downwardly extending position, said intermediate passageway portion extending through said body from the upper end of said inner portion to the upper end of said outer portion, and said outer portion extending through said flange and opening to the atmosphere through the lower edge of said flange for shielding said passageway from obstruction due to collection of particles in the atmosphere on said cap.

References Cited in the file of this patent

UNITED STATES PATENTS

| | | |
|---|---|---|
| 848,618 | Anson | Apr. 2, 1907 |
| 1,292,988 | Bacon | Feb. 4, 1919 |
| 1,432,714 | Metheny | Oct. 17, 1922 |
| 1,450,077 | Hass | Mar. 27, 1923 |
| 1,550,480 | Woelke, Jr. | Aug. 18, 1925 |
| 1,683,338 | Evinrude | Sept. 4, 1928 |
| 1,859,479 | Thwaits | May 24, 1932 |
| 2,062,218 | Gielen, Sr. | Nov. 24, 1936 |
| 2,318,424 | Sattler | May 4, 1943 |